United States Patent
Tarasinski et al.

(10) Patent No.: US 11,374,371 B2
(45) Date of Patent: Jun. 28, 2022

(54) PLUG ARRANGEMENT FOR PRODUCING A DETACHABLE MULTI-PURPOSE CONNECTION

(71) Applicant: Deere & Company, Moline, IL (US)

(72) Inventors: Nicolai Tarasinski, Frankenthal (DE); Volker Kegel, Mannheim (DE); Philipp Lehmann, Homburg (DE); Julian Daubermann, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 93 days.

(21) Appl. No.: 16/794,186

(22) Filed: Feb. 18, 2020

(65) Prior Publication Data

US 2020/0266590 A1    Aug. 20, 2020

(30) Foreign Application Priority Data

Feb. 18, 2019    (DE) .......................... 102019202151.4

(51) Int. Cl.
*H01R 24/58* (2011.01)
*G06K 7/14* (2006.01)
(Continued)

(52) U.S. Cl.
CPC ........... *H01R 24/58* (2013.01); *G06K 7/1413* (2013.01); *H01R 13/6683* (2013.01);
(Continued)

(58) Field of Classification Search
CPC .. G06K 7/1413; H01R 24/58; H01R 13/6683; H01R 13/447; H01R 13/5219; H01R 2105/00
See application file for complete search history.

(56) References Cited

U.S. PATENT DOCUMENTS 2,562,544 A  *  7/1951  Gleason ................. H01R 24/58
                                                    439/140
6,554,490 B1    4/2003  Sumi et al.
(Continued)

FOREIGN PATENT DOCUMENTS

DE    102017201544 A1    2/2018
DE    102017217481 A1    4/2019

OTHER PUBLICATIONS

European Search Report issued in counterpart application No. 20157602.2 dated Jul. 20, 2020 (05 pages).
(Continued)

*Primary Examiner* — Renee S Luebke
*Assistant Examiner* — Paul D Baillargeon
(74) *Attorney, Agent, or Firm* — Hanley, Flight & Zimmerman, LLC

(57) ABSTRACT

A plug arrangement for producing a detachable multi-purpose connection, the arrangement comprising: a housing body and a contact element that is connected to the housing body, wherein the contact element is oriented in a rotationally symmetrical manner in relation to a predetermined plugging direction and comprises at least one annular contact zone arranged along the predetermined plugging direction; and at least one code segment disposed on the contact element, said code segment forming an angular code that varies with a rotational position of the contact element.

15 Claims, 2 Drawing Sheets

(51) Int. Cl.
  *H01R 13/66* (2006.01)
  *H01R 13/447* (2006.01)
  *H01R 13/52* (2006.01)
  *H01R 105/00* (2006.01)

(52) U.S. Cl.
  CPC ........ *H01R 13/447* (2013.01); *H01R 13/5219* (2013.01); *H01R 2105/00* (2013.01)

(56) References Cited

U.S. PATENT DOCUMENTS

| | | | |
|---|---|---|---|
| 6,790,070 B1* | 9/2004 | England, II | ........ H01R 13/6397 439/305 |
| 8,192,234 B2* | 6/2012 | Wittenberg | ........... G06F 3/0362 439/620.21 |
| 9,768,547 B1* | 9/2017 | Lindstrom | ......... H01R 13/5213 |
| 9,898,247 B2* | 2/2018 | Kim | ...................... H01R 29/00 |
| 2009/0110404 A1 | 4/2009 | Agevik | |
| 2009/0286427 A1 | 11/2009 | Bolin et al. | |
| 2011/0116747 A1* | 5/2011 | Terlizzi | ................. H01R 24/58 385/75 |
| 2015/0318640 A1 | 11/2015 | Gibeau | |

OTHER PUBLICATIONS

"Phone connector (audio)," Wikipedia, The Free Encyclopedia [online], Dec. 14, 2020 [retrieved on Dec. 22, 2020]. Retrieved from the Internet: <https://en.wikipedia.org/w/index.php?title=Phone_connector_(audio)&oldid=994262708>.

\* cited by examiner

PLUG ARRANGEMENT FOR PRODUCING A DETACHABLE MULTI-PURPOSE CONNECTION

FIELD OF INVENTION

The invention relates to a plug arrangement for producing a detachable multi-purpose connection, having a housing body and a contact element that is connected to the housing body, wherein the contact element is embodied in a rotationally symmetrical manner in relation to a predetermined plugging direction and comprises annular contact zones that are arranged along the predetermined plugging direction.

BACKGROUND

A plugging arrangement of this type is known as a jack plug and used in, inter alia, certain audio, stage or studio technologies to transmit audio signals or supply voltages of comparatively low current strength. The construction of the jack plug renders it possible to freely rotate said jack plug in an associated coupling socket with the result that a cable that is connected to said jack plug is protected against undesired twisting. Owing to this characteristic, the use of a jack plug connection even also offers the production of a cable-connected multi-purpose connection to an electrically-operated agricultural machine since an associated cable can follow possible changes in orientation of the agricultural machine owing to the ability of the plug connection to freely rotate.

SUMMARY

Various aspects of examples of the present disclosure are set forth in the claims. In one example, a plug arrangement for producing a detachable multi-purpose connection is provided. The arrangement comprising: a housing body and a contact element that is connected to the housing body, wherein the contact element is oriented in a rotationally symmetrical manner in relation to a predetermined plugging direction and comprises at least one annular contact zone arranged along the predetermined plugging direction; and at least one code segment disposed on the contact element, said code segment forming an angular code that varies with a rotational position of the contact element.

In another example, a detachable multi-purpose plug system is provided. This system comprising: a housing body and a contact element that is connected to the housing body, wherein the contact element is oriented in a rotationally symmetrical manner in relation to a predetermined plugging direction and comprises at least one annular contact zone arranged along the predetermined plugging direction; at least one code segment disposed on the contact element, said code segment forming an angular code that varies with a rotational position of the contact element; and a socket configured to receive the contact element, the socket configured with an internal code segment reader for reading the at least one code segment within the socket.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
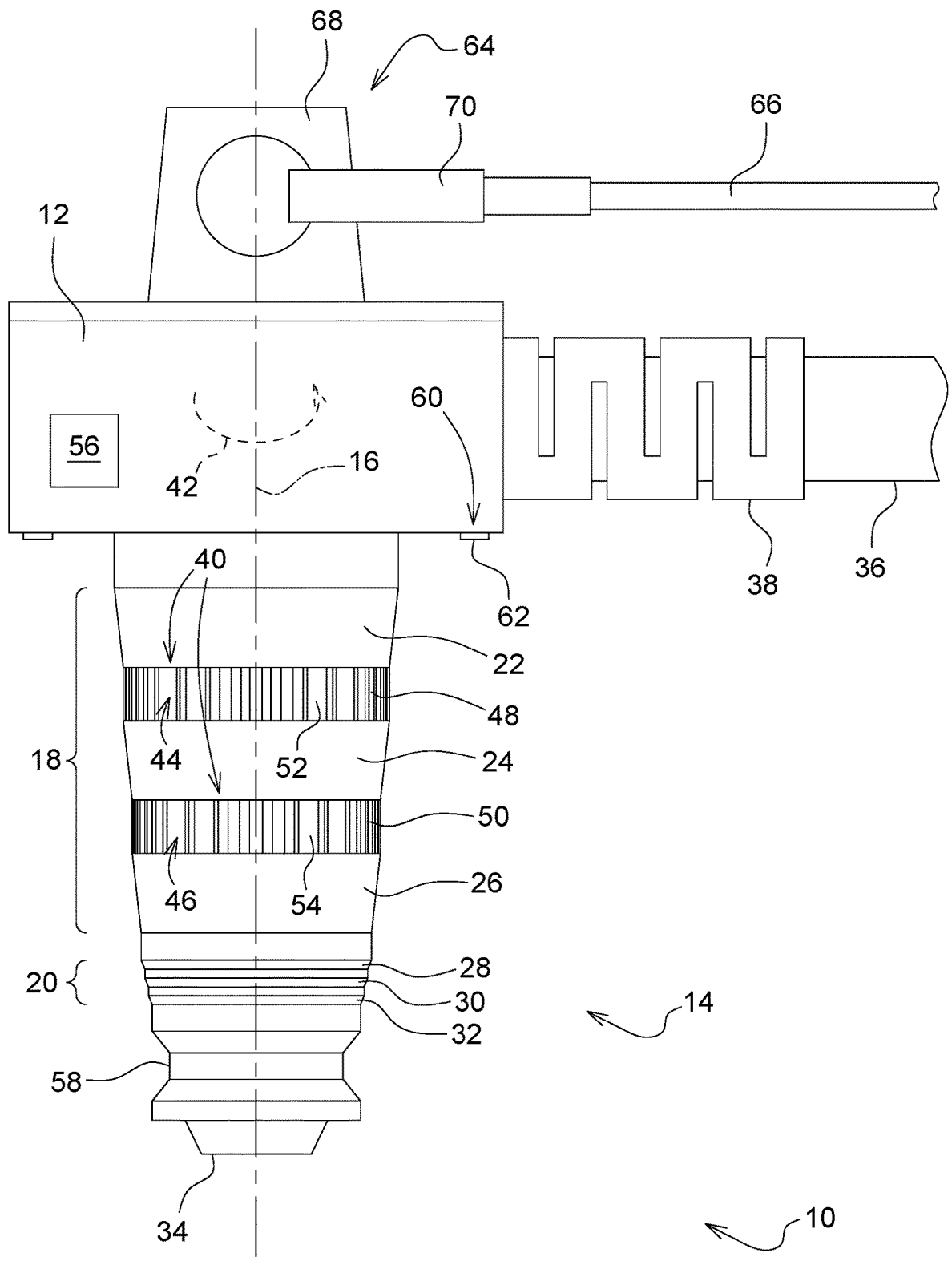
FIG. 1 illustrates an exemplary embodiment of the plug arrangement for producing a multi-purpose connection.

The object of the present invention is therefore to provide a robust arrangement for ascertaining the orientation of multi-purpose cable that is provided for the electrical operation of an agricultural machine. In one example, the multi-purpose cable is configured to be at least one of an energy and/or data-transmitting cable. It is contemplated that the multi-purpose cable may have other purposes beyond energy and/or data-transmitting. This object is achieved by virtue of a plug arrangement or a plug coupling arrangement having the features as described in the claims.

The plug arrangement in accordance with one example is a detachable multi-purpose connection comprising a housing body and a contact element that is connected to the housing body, wherein the contact element is embodied in a rotationally symmetrical manner in relation to a predetermined plugging direction and comprises annular contact zones that are arranged along the predetermined plugging direction. In this case, at least one code segment is provided on the contact element, said code segment forming an angular code that clearly varies with a rotational position of the contact element.

In this context, German Patent Application No. DE 10 2017 201 544 A1 discloses an agricultural machine having a cable drum, said agricultural machine being operated in a cable-connected manner. In order to prevent driving over a cable section that has been reeled off from the cable drum, the orientation of said cable section is ascertained using sensors. The ascertaining procedure is performed by a pivotable probe, the construction of which being comparatively complex and susceptible to contaminants or damage from the outside.

In one example, such as that in the case of a cable-connected agricultural machine that is consequently electrically operated, the associated cable is typically attached in a detachable manner on one of its two ends by a detachable plug connection to an energy supply station or a further electrically-operated agricultural machine. Owing to the rotational symmetry of the contact element this cable may rotate freely within an associated plug coupling arrangement with the result that the respective rotational position of the contact element or the angular code that results therefrom directly indicates the orientation of the cable that is attached to said contact element. This information may be used by way of example to control or steer the agricultural machine that is operated via the cable. For this purpose, the plug arrangement is attached to the agricultural machine in such a manner that the axis of rotation of the contact element coincides with the vertical axis of the agricultural machine, said axis of rotation being defined by the predetermined plugging direction. Owing to the fact that in the plugged state, the at least one code segment is positioned in the interior and also owing to the constructive integration of said code segment into the contact element, the arrangement that is produced in this manner renders possible a particularly robust procedure for ascertaining the orientation of the multi-purpose cable that is provided for the electrical operation of the agricultural machine.

In this case, the annular contact zones may be used uniformly to transmit energy as well as to transmit data.

These are conductive section rings of a corresponding width that are embodied from copper, wherein these section rings are electrically insulated from one another. In order to be protected against oxidation, the conductive section rings may in addition be hard coated by a noble metal such as by way of example gold or rhodium.

The plug arrangement may either be embodied as an angle plug in which an multi-purpose cable that is introduced into the housing body extends at a right-angle with respect to the predetermined plugging direction or however may also be embodied as a straight plug having a cable that is introduced into the housing body in the direction of the predetermined plugging direction.

The agricultural machine is by way of example an agricultural tractor, a harvesting machine, a field chopper, a self-driving spraying machine or the like, wherein multiple agricultural machines may form a formation of team vehicles that communicate with one another via an associated multi-purpose cable. An example for such a formation of team vehicles is found in German Patent Application No. DE 10 2017 217 481 A1. In addition, a use in conjunction with construction machines is also conceivable in which by way of example said formation of team vehicles operates together in a road construction crew or the like.

It is preferred that the at least one code segment is embodied as a bar code that is arranged in an annular manner on the contact element. The bar code may be arranged in the shape of an associated section ring between the annular contact zones of the contact element and may comprise a plurality of coding bars that extend in the predetermined plugging direction. The at least one code segment may be read in this case in a wear-free manner by a procedure for ascertaining the coding bars in a contactless manner using sensors.

The term "coding bar" in this case is understood in an abstract manner and any number of methods and means for coding may be utilized by one of ordinary skill in the art. It may thus also be accordingly magnetized regions in addition to markings that may be perceived optically. The latter are embedded in the section ring that comprises the at least one code segment, characterized by resistance to outer contaminants and damage. The bar code may accordingly be read either optically or magnetically.

Furthermore, there is the possibility that the at least one code segment comprises at least two bar codes that are arranged one behind the other in the predetermined plugging direction. In this case, the bar codes are either arranged in a redundant manner or however are arranged rotated with respect to one another or offset in such a manner that it is rendered possible to simultaneously determine the direction of rotation of the contact element.

In lieu of the use of a section ring that is provided with a bar code, it is also conceivable that the at least one code segment is embodied as a sensor ring that is arranged in an annular manner on the contact element, said sensor ring having a magnetization that varies continuously along the circumference of said sensor ring. In this case, the orientation of the magnetization allows a direct conclusion regarding the respective angle of rotation of the contact element, whereas the strength of magnetization forms a clear measure for its respective rotational position.

In order to prevent an undesired detachment of a plug connection that is produced using the plug arrangement, it is possible for a constriction that extends circumferentially on the contact element to secure the plug arrangement upon insertion into a plug connection. The constriction may be located in the end region of the contact element.

In addition, a housing sealing layer may be provided on the housing body to produce a seat that is sealed with respect to dust and/or fluid when a plug connection to a plug coupling arrangement is produced. In the simplest case, the housing sealing layer may be a circumferential rubber lip that is pressed in a sealed manner against a coupling housing that a plug coupling arrangement comprises.

In addition, a fastening element for attaching a holding cable may be embodied on the housing body of the plug arrangement. The holding cable is stored by way of example on a cable drum and is used to guide or release the cable that is provided to operate the agricultural machine. The respective reeling state of the cable drum renders it possible to make a direct conclusion regarding the prevailing distance between the agricultural machine and the original point of the holding cable and therefore finally also the cable. Together with the directional position of the agricultural machine, said directional position being obtained from the rotational position of the contact element, it is possible to clearly determine the position relative to the fixed original point. Alternatively, in lieu of a holding cable it is also possible to embody a pure distance measuring cable in order to realize a cable control sensor. The fastening element may be molded as a fastening eye as a single part on an upper side of the housing body of the plug arrangement, wherein a carabiner hook or the like that is connected to the holding cable may be clipped into the fastening eye.

In addition to the annular contact zones, it is also possible to provide a light guide that is provided on the contact element for broadband or interference-free optical transmission of digital data.

Optionally, there is the possibility that the at least one code segment additionally comprises a typification code that characterizes a function of the contact element. The typification code may be specific to the configuration of control systems or drive systems of the agricultural machine, said control systems or drive systems communicating via the cable. The typification code may be stored in an additional RFID tag that is accommodated as a component of the at least one code segment in the housing body of the plug arrangement.

Furthermore, a plug coupling arrangement for receiving the plug arrangement in accordance with the invention comprises a socket that is embodied in a manner that complements the contact element, wherein resilient contacts that may be brought into contact with the annular contact zones and also code segment reader for reading the at least one code segment are provided within the socket. The code segment reader may be, by way of example, a reflection light sensor for scanning a bar code that may be read optically or may be a Hall sensor for ascertaining a magnetic field that is influenced or produced by a bar code that may be read magnetically or a magnetized sensor ring.

Furthermore, a protective cover may be attached to a coupling housing to protect the socket against penetrating contaminants and said protective cover may be brought against a returning force out of a position that closes the socket to the outside into a position that releases the socket. The protective cover may be attached to the coupling housing in a pivotable or displaceable manner for this purpose.

In order to secure the plug arrangement within the socket, the plug coupling arrangement may comprise a manually-actuatable locking feature having a ball coupling that is embodied to engage in a detachable manner into a constriction that extends circumferentially on the contact element. In one example, the constriction is acts as locking feature and may be prestressed in the direction of a locking position. The locking feature may comprise an unlocking piece that may be actuated by hand and said unlocking piece may be brought into an unlocking position that releases the ball coupling.

In order to facilitate or to support a detachment of a plug connection that is produced between the plug arrangement and plug coupling arrangement, it is possible to provide a resilient element that is arranged on the end face within the socket so as to exert an expelling force on a contact element that is located in the socket.

In addition, it is possible that a socket sealing layer that is arranged within the socket to produce a seat that is sealed with respect to dust and/or fluid is provided opposite a contact element located in the socket. In the simplest case, the socket sealing layer is a rubber ring that extends circumferentially, said rubber ring being pressed in a sealed manner against the contact element that this plug arrangement comprises when the plug connection to the plug arrangement is produced.

FIG. 1 illustrates an exemplary embodiment of the plug arrangement in accordance with the detachable multi-purpose connection to an electrically operated agricultural machine (not shown). The plug arrangement 10 that is embodied as a type of jack plug comprises a housing body 12, which is embodied from a glass fiber-reinforced synthetic material or metal die-cast, and a contact element 14 that is connected to the housing body 12. The contact element 14 is embodied in a rotationally symmetrical manner in relation to a predetermined plugging direction 16 and comprises multiple annular contact zones 18, 20 that are arranged along the predetermined plugging direction 16.

In this example, the annular contact zones 18, 20 comprise first, second and third conductive section rings 22, 24, 26 for transmitting energy and fourth, fifth and sixth conductive section rings 28, 30, 32 for transmitting data, wherein these section rings are electrically insulated from one another. The conductive section rings 22 to 32 are embodied from copper and comprise a width that corresponds to the respective current strength that is to be transmitted. In order to be protected against oxidation the conductive section rings 22 to 32 are hard-coated by a noble metal such as by way of example gold or rhodium.

In addition to the annular contact zones 18, 20, a light guide 34 that is provided on the contact element 14 is additionally provided for broadband or interference-free optical transmission of digital data. In the present case, this light guide is located on an end-face end of the contact element 14.

In the present case, the plug arrangement 10 may be an angle/angular plug introduced into the housing body 12 a right angle with respect to the predetermined plugging direction 16. A bend protection 38 that is embodied from elastic synthetic material is used in this case to relieve the mechanical load on the cable 36.

Furthermore, at least one code segment 40 is provided on the contact element 14, said code segment forming an angular code that clearly varies with a rotational position 42 of the contact element 14.

The plug arrangement 10 may freely rotate within an associated plug coupling arrangement owing to the rotational symmetry of the contact element 14 with the result that the respective rotational position 42 of the contact element 14 or the angular code that results therefrom directly indicates the orientation of the cable 36 that is attached to said contact element. This information may be used by way of example for the control or steering of the agricultural machine that is operated via the cable 36. For this purpose, the plug arrangement 10 is attached to the agricultural machine in such a manner that the axis of rotation of the contact element 14 coincides with the vertical axis of the agricultural machine, said axis of rotation being defined by the predetermined plugging direction 16.

According to the illustration in FIG. 1, the at least one code segment 40 is embodied as a first or second bar code 44, 46 that is arranged in an annular manner on the contact element 14. Each of the two bar codes 44, 46 is arranged in the shape of an associated section ring 48, 50 between the annular contact zones 18, 20 of the contact element 14 and comprises a plurality of coding bars 52, 54 that extend in the predetermined plugging direction 16.

The term "coding bar" is in this case to be understood in an abstract manner. The bar code is thus either markings that may be perceived optically or however is accordingly magnetized regions. The latter are embedded into the section rings 48, 50 that the at least one code segment 40 comprises. Accordingly, the first or second bar code 44, 46 may be read either optically or magnetically.

The two bar codes 44, 46 are arranged in the predetermined plugging direction 16 one behind the other rotated with respect to one another or offset in such a manner that it is rendered possible to simultaneously determine the direction of rotation of the contact element 14.

Optionally, the at least one code segment 40 comprises a typification code that characterizes a function of the contact element 14. This typification code is used for the configuration of control systems or drive systems of the agricultural machine, said control systems or drive systems being operated via the cable 36. The typification code is stored in an additional RFID identification tag 56 that is accommodated as a component of the at least one code segment 40 in the housing body 12 of the plug arrangement 10.

In the case of a (not illustrated) alternative embodiment of the at least one code segment 40, in lieu of the use of a section ring 48, 50 that is provided with a bar code 44, 46, a sensor ring is provided that is arranged in an annular manner on the contact element 14 and has a magnetization that varies continuously along the circumference of said sensor ring. In this case, the orientation of the magnetization allows a direct conclusion regarding the respective direction of rotation of the contact element 14, whereas the magnetization strength forms a clear measure for the respective rotational position 42 of said contact element.

In order to prevent an undesired detachment of a plug connection that is produced using the plug arrangement 10, a constriction 58 that extends circumferentially on the contact element 14, the constriction configured to secure and/or retain the plug arrangement 80 upon insertion into a plug connection. The constriction 58 is located at an end region of the contact element 14.

A housing sealing layer 60 that is provided on the housing body 12 is used to produce a seat that is sealed with respect to dust and/or fluid when the plug connection to the plug coupling arrangement 80 is produced. The housing sealing layer 60 is a rubber lip 62 that extends circumferentially, said rubber lip being pressed in a sealed manner against a coupling housing that the plug coupling arrangement 80 comprises.

In addition, a fastening element 64 for attaching a holding cable 66 is embodied on the housing body 12 of the plug arrangement 10. The holding cable 66 is stored by way of example on a (not illustrated) cable drum and is used to guide or release the cable 36 that is provided to operate the agricultural machine. The fastening element 64 is molded as a fastening eye 68 as a single part on an upper side of the housing body 12 of the plug arrangement 10, wherein a carabiner hook 70 or the like that is connected to the holding cable 66 is clipped into the fastening eye 68.

Figure 2:
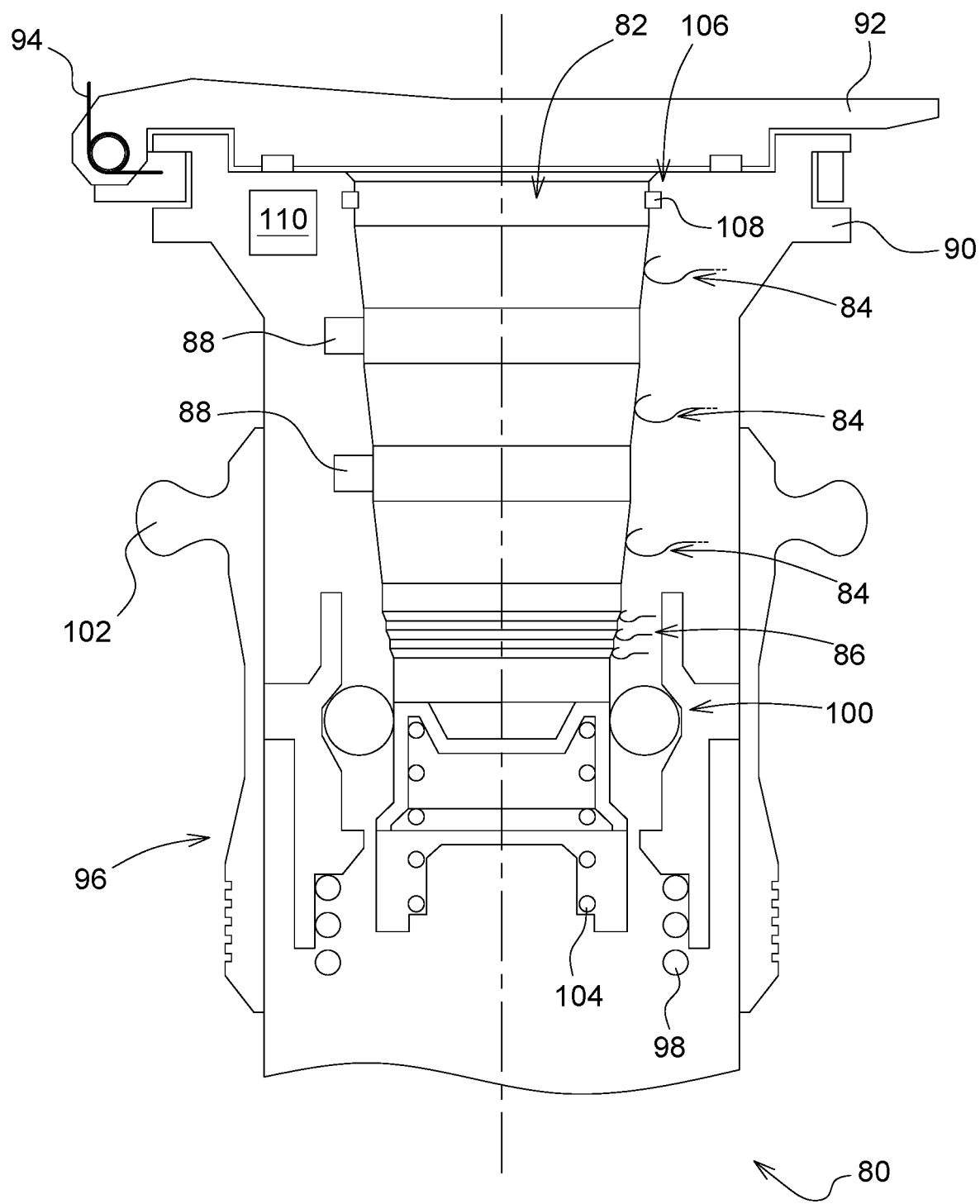
FIG. 2 illustrates a section of an exemplary embodiment of the plug coupling system for use with the plug arrangement is illustrated in FIG. 1.

FIG. 2 illustrates a section of an exemplary embodiment of the plug coupling arrangement in accordance with the invention for use with the plug arrangement 10 that is illustrated in FIG. 1. The plug coupling arrangement 80 comprises a socket 82 for receiving the plug arrangement 10, said socket being embodied in a manner that complements the contact element 14, wherein resilient contacts 84, 86 that may be brought into contact with the annular contact zones 18, 20 and also code segment reader 88 for reading the at least one code segment 40 are provided within the socket 82. The code segment reader 88 are by way of example a reflection light sensor for scanning a bar code 44, 46 that may be read optically or may be a Hall sensor for ascertaining a magnetic field that is influenced or produced by a bar code 44, 46 that may be read magnetically or a magnetized sensor ring.

A protective cover 92 is attached to a coupling housing 90 to protect the socket 82 against penetrating contaminants and said protective cover may be brought against a returning force out of a position that closes the socket 82 to the outside into a position that releases the socket 82. The protective cover 92 is attached to the coupling housing 90 in a pivotable manner for this purpose. The returning force is applied by a torsion spring 94.

In order to secure the plug arrangement 10 within the socket 82, the plug coupling arrangement 80 comprises a manually-actuatable locking feature 96 having a ball coupling 100 that is embodied so as to engage in a detachable manner into the constriction 58 that extends circumferentially on the contact element 14, wherein the locking feature 96 is prestressed by a pressure spring 98 in the direction of a locking position. The locking feature 96 comprises an unlocking piece 102 that may be actuated by hand and said unlocking piece may be brought into an unlocking position that releases the ball coupling 100.

In order to facilitate or to support a detachment of a plug connection that is produced between the plug arrangement 10 and plug coupling arrangement 80, a resilient element 104 that is arranged on the end face within the socket 82 so as to exert an expelling force is provided for the case that the contact element 14 is located in the socket 82.

In addition, a socket sealing layer 106 that is arranged within the socket 82 to produce a seat that is sealed with respect to dust and/or fluid is provided opposite the contact element 14. The socket sealing layer 106 is a rubber ring 108 that extends circumferentially, said rubber ring being pressed in a sealed manner against the contact element 14 that this plug arrangement comprises when the plug connection to the plug arrangement 10 is produced.

Optionally, an RFID reading unit 110 is provided to read the typification code that is stored in the RFID identification tag 56.

In conclusion, it is to be noted that the agricultural machine that is operated via the cable 36 may be an agricultural tractor, a harvesting machine, a field chopper, a self-driving spraying machine or the like, wherein multiple agricultural machines may form a formation of team vehicles that communicate with one another via an associated multi-purpose cable. An example for such a formation of team vehicles is found in German Patent Application No. DE 10 2017 217 481 A1.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of a skilled artisan in light of this disclosure. In addition, those skilled in the art will appreciate that the mechanisms of the subject matter described herein are capable of being distributed as a program product in a variety of forms, and that an illustrative embodiment of the subject matter described herein applies regardless of the type of signal bearing medium used to carry out the distribution. Examples of a signal bearing medium include, but are not limited to, the following: an edge computing module or device; a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a computer system or computing element (or portion thereof) such as, but not limited to, one or more or some combination of: a visual organizer system, a request generator, an Internet coupled computing device, a computer server, etc. In one example, the computer system and/or the computing element may manipulate and transform information and/or data represented as physical (electronic) quantities within the computer system's and/or computing element's processor(s), register(s), and/or memory(ies) into other data similarly represented as physical quantities within the computer system's and/or computing element's memory(ies), register(s) and/or other such information storage, processing, transmission, and/or display components of the computer system(s), computing element(s) and/or other electronic computing device(s). Under the direction of computer-readable instructions, the computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. A plug arrangement for producing a detachable multi-purpose connection, the plug arrangement comprising:
   a housing body and a contact element that is connected to the housing body, the contact element oriented in a rotationally symmetrical manner in relation to a predetermined plugging direction, the contact element including at least one annular contact zone arranged along the predetermined plugging direction; and
   at least one code segment disposed on the contact element, the at least one code segment forming an angular code that varies with a rotational position of the contact element, the at least one code segment including a bar code arranged in an annular manner on the contact element.

2. The plug arrangement of claim 1, wherein the bar code may be read at least one of optically or magnetically.

3. The plug arrangement of claim 1, wherein the at least one code segment is a sensor ring that is annularly arranged on the contact element, the sensor ring having a magnetization that varies along a circumference of the sensor ring.

4. The plug arrangement of claim 1, further including a constriction that extends circumferentially on the contact element, the constriction to secure the plug arrangement upon insertion of the plug arrangement into a plug connection.

5. The plug arrangement of claim 1, further including a housing sealing layer on the housing body, the housing sealing layer to produce a seat that is sealed with respect to at least one of dust or fluid when the plug arrangement is inserted into a plug connection.

6. The plug arrangement of claim 1, further including a fastening element for attaching a holding cable to the housing body.

7. The plug arrangement of claim 1, further including a light guide disposed on the contact element, the light guide to provide for optical transmission of digital data.

8. The plug arrangement of claim 1, wherein the at least one code segment is a typification code that characterizes a function of the contact element.

9. A plug arrangement for producing a detachable multi-purpose connection, the plug arrangement comprising:

a housing body and a contact element connected to the housing body, the contact element oriented in a rotationally symmetrical manner in relation to a predetermined plugging direction, the contact element including at least one annular contact zone arranged along the predetermined plugging direction; and at least one code segment disposed on the contact element, the at least one code segment forming an angular code that varies with a rotational position of the contact element, the at least one code segment including at least two bar codes, a first bar code of the at least two bar codes arranged at an offset in the predetermined plugging direction from a second bar code of the at least two bar codes.

10. A detachable multi-purpose plug system, the detachable multi-purpose plug system comprising:

a housing body and a contact element connected to the housing body, the contact element oriented in a rotationally symmetrical manner in relation to a predetermined plugging direction, the contact element including at least one annular contact zone arranged along the predetermined plugging direction;

at least one code segment disposed on the contact element, the code segment forming an angular code that varies with a rotational position of the contact element, the at least one code segment including a bar code arranged in an annular manner on the contact element; and a socket to receive the contact element, the socket including an internal code segment reader for reading the at least one code segment within the socket.

11. The detachable multi-purpose plug system of claim 10, further including a protective cover attached to a coupling housing, the protective cover to move between a first position in which the protective cover closes the socket and a second position in which the protective cover releases the socket.

12. The detachable multi-purpose plug system of claim 10, further including a manually-actuatable locking feature, the manually-actuatable locking feature to detachably engage with a constriction extending circumferentially on the contact element, the manually-actuatable locking feature prestressed in a direction of a locking position.

13. The detachable multi-purpose plug system of claim 10, the socket including at least one internal resilient contact to interact with the at least one annular contact zone of the contact element.

14. The detachable multi-purpose plug system of claim 10, further including a resilient element arranged on an end face within the socket, the resilient element to exert an expelling force on the contact element.

15. The detachable multi-purpose plug system of claim 10, further including a socket sealing layer disposed within the socket, the socket sealing layer to produce a sealed seat when opposite the contact element.

* * * * *